United States Patent [19]

Salani

[11] 4,353,261

[45] Oct. 12, 1982

[54] MULTI-POSITION AMPLITUDE DEVICE

[75] Inventor: Chittaranjan Salani, Springfield, Ohio

[73] Assignee: The Koehring Company, Brookfield, Wis.

[21] Appl. No.: 237,595

[22] Filed: Feb. 24, 1981

[51] Int. Cl.³ .......... F16H 33/00

[52] U.S. Cl. .......... 74/87; 404/117; 74/61; 366/116

[58] Field of Search .......... 404/117, 113, 114; 74/87, 61; 366/116

[56] References Cited

U.S. PATENT DOCUMENTS

| | | | |
|---|---|---|---|
| 3,590,702 | 7/1971 | Sechi | 404/117 |
| 3,598,029 | 8/1971 | Paramythioti | 404/117 |
| 3,618,485 | 11/1971 | Hermann | 404/117 |
| 3,670,631 | 6/1972 | Gaylord | 404/117 |
| 3,892,496 | 7/1975 | Martinez | 404/117 |
| 4,176,983 | 12/1979 | Gardner | 404/117 |

FOREIGN PATENT DOCUMENTS

| | | | |
|---|---|---|---|
| 1018538 | 10/1952 | France | 404/117 |

*Primary Examiner*—Nile C. Byers, Jr.
*Attorney, Agent, or Firm*—Burns, Doane, Swecker & Mathis

[57] ABSTRACT

A vibratory mechanism comprises a motor-driven shaft, a first mass carried by the shaft for rotation therewith, and a variable mass supported for rotation relative to the shaft whereby the angular relationship between the first mass and the variable mass can be selectively adjusted to vary the amplitude of vibration. A drive member is rotatable with the shaft. The variable mass carries a plurality of longitudinally and circumferentially spaced abutment surfaces. The drive member carries a contact face. Engagement between the contact face and the abutment surfaces occurs at different angular relationships between the first mass and the variable mass to vary the amplitude of vibration. A control mechanism produces relative longitudinal movement between the variable mass and the drive member to circumferentially align the contact face with a selected one of the surfaces such that rotation of the drive member produces driving engagement between the selected surface and the contact face to rotate the variable mass with the shaft.

9 Claims, 5 Drawing Figures

Fig. 3
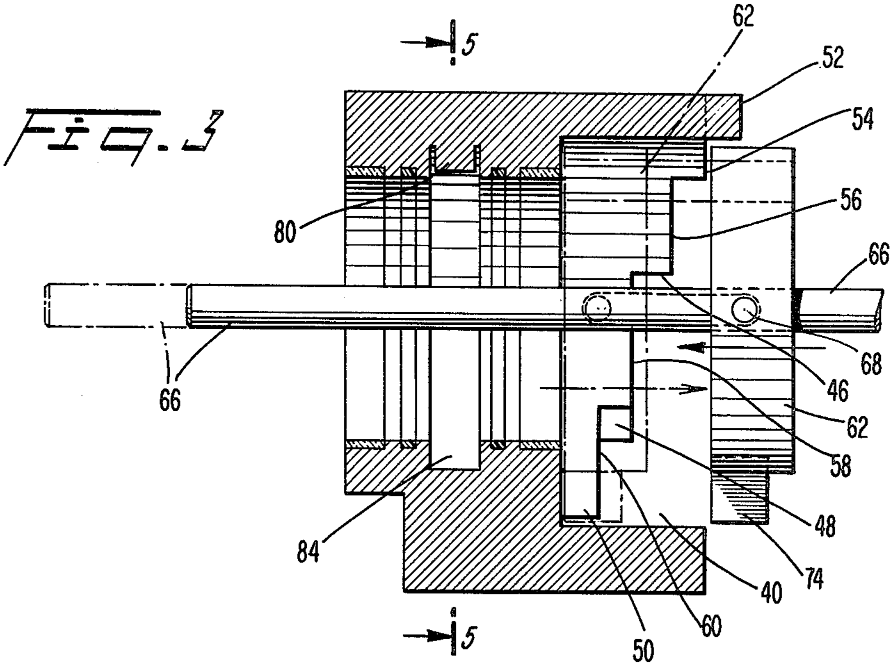
Fig. 4
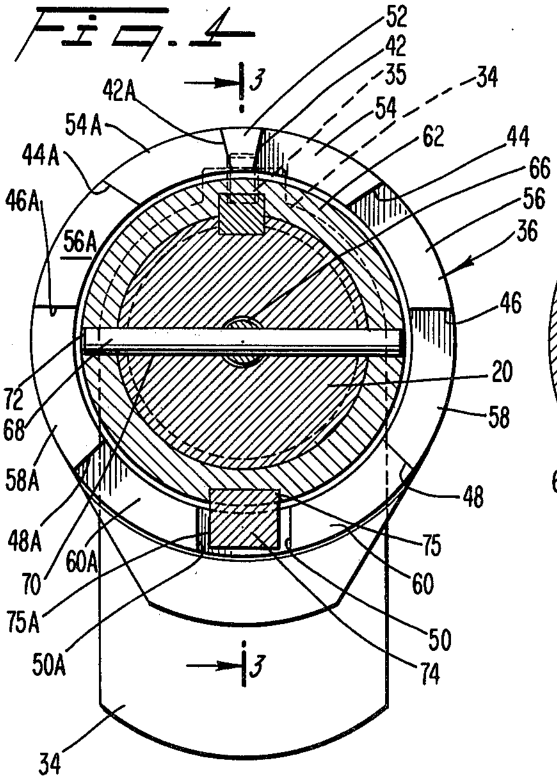
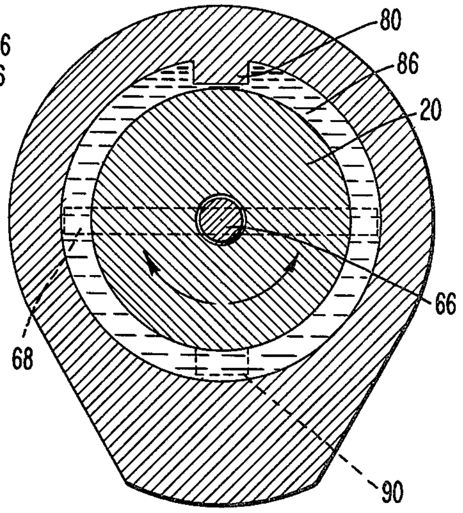
Fig. 5

MULTI-POSITION AMPLITUDE DEVICE

BACKGROUND AND OBJECTS OF THE INVENTION

The present invention relates to vibration inducing mechanisms, especially for use in ground compaction rollers.

Vibratory rollers typically employ a vibratory mechanism for imparting vibratory characteristics to a large compacting drum. Generally, the vibratory mechanism comprises a rotary shaft on which is mounted one or more eccentric masses which produce the vibratory forces when the shaft is rotated. Since different intensities of vibration are required for different compacting operations, it is desirable that the eccentric mass(es) be adjustable to enable the amplitude of the vibration to be varied.

One manner of adjusting the amplitude of vibration involves varying the relative angular position of a pair of eccentric masses about a drive shaft. That is, by positioning the centers of gravity of the masses closely together, the overall eccentric forces are maximized, and by angularly separating the centers of gravity, the overall eccentric forces tend to be counterbalanced to a greater degree.

Exemplary of such manner of adjustment are the disclosures in U.S. Pat. No. 3,192,839 issued to Vivier on July 6, 1965; U.S. Pat. No. 3,892,496 issued to Martinez on July 1, 1975; U.S. Pat. No. 3,722,381 issued to Tuneblom on Mar. 27, 1973; U.S. Pat. No. 3,670,631 issued to Gaylord on June 20, 1972; and U.S. Pat. No. 3,909,147 issued to Takata on Sept. 30, 1975. Each of those patents discloses a pair of eccentric weights whose relative angular relationship can be adjusted to vary the amplitude of vibration. In the apparatus disclosed in the Tuneblom and Martinez patents, two positions of adjustment of the masses are provided, it being required that the direction of rotation of the drive shaft be reversed to effect adjustment. Also in the Martinez patent an impact dampener is provided to minimize shock when the masses contact. In the apparatus disclosed in the Gaylord patent, separate hydraulic motors are required to separately drive two masses. In Takata the axial displacement of a control rod unlocks one or more movable masses for centrifugally-induced movement to different positions of adjustment; to achieve more than two positions of adjustment, at least two movable masses are required. In the apparatus disclosed in the Vivier patent a drive train is provided for rotating two weights in opposite directions. The drive train includes an axially movable sleeve having helical slots which receive pins projecting from a pinion. By axially moving the sleeve, the slots produce rotation of the pinion in order to vary the angular relationship between the weights.

It will be appreciated that a vibration system which requires that the direction of rotation of the drive shaft be reversed in order to vary the amplitude of vibration, reduces the versatility of the apparatus. For example, in connection with compacting rollers, there are certain rolling operations wherein it is preferable to rotate the eccentric masses in the same direction as the roller, while during other operations it is preferable to rotate the masses in an opposite direction relative to that of the roller. Thus, it would be desirable that adjustment between different amplitudes of vibration be possible in either direction of rotation of the vibrator drive shaft.

Vibrator systems which permit only two positions of adjustment, regardless of the direction of rotation, may not provide a sufficient number of potential amplitudes of vibration to satisfy the usual requirements. Also, vibrators which require separate motors for the weights or a drive train including a helically grooved shaft and pin-carrying pinions may be more complex than is desired.

It is therefore, an object of the present invention to provide a novel vibratory roller which avoids or minimizes shortcomings of the above-described sort.

It is another object of the invention to provide a vibratory roller which enables at least several positions of adjustment to be selected.

It is a further object of the invention to provide for more than two positions of adjustment, in either direction of rotation of the vibrator shaft.

It is an additional object of the invention to provide a vibratory roller which is relatively simple in construction and more easily maintained.

It is still another object of the invention to dampen the impact occurring between a variable mass and a drive shaft.

BRIEF SUMMARY OF THE INVENTION

These objects are achieved by vibratory mechanism of the type comprising a motor-driven shaft, a first mass carried by the shaft for rotation therewith, and a variable mass supported for rotation relative to the shaft whereby the angular relationship between the first mass and the variable mass can be selectively adjusted to vary the amplitude of vibration. A drive member is rotatable with the shaft. One of the drive member and the variable mass carries a plurality of longitudinally and circumferentially spaced abutment surfaces. The other of the drive member and the variable mass carries a contact face. Engagement between the contact face and the abutment surfaces occurs at different angular relationships between the first mass and the variable mass to vary the amplitude of vibration. A control mechanism produces relative longitudinal movement between the variable mass and the drive member to circumferentially align the contact face with a selected one of the surfaces such that rotation of the drive member produces driving engagement between the selected surface and the contact face to rotate the variable mass with the shaft.

THE DRAWINGS

Other objects and advantages of the invention will become apparent from the following detailed description of a preferred embodiment thereof in connection with the accompanying drawings in which like numerals designate like elements, and in which:

FIG. 3 is an enlarged longitudinal sectional view of a variable mass and a drive dog for rotating the same, with the vibrator drive shaft removed for the sake of clarity;

FIG. 4 is a cross-sectional view of the vibrator taken along line 4—4 of FIG. 2; and FIG. 5 is a cross-sectional view taken along line 5—5 of FIG. 3, depicting an impact-dampening system according to the present invention.

DETAILED DESCRIPTION OF A PREFERRED EMBODIMENT OF THE INVENTION

Figure 1:
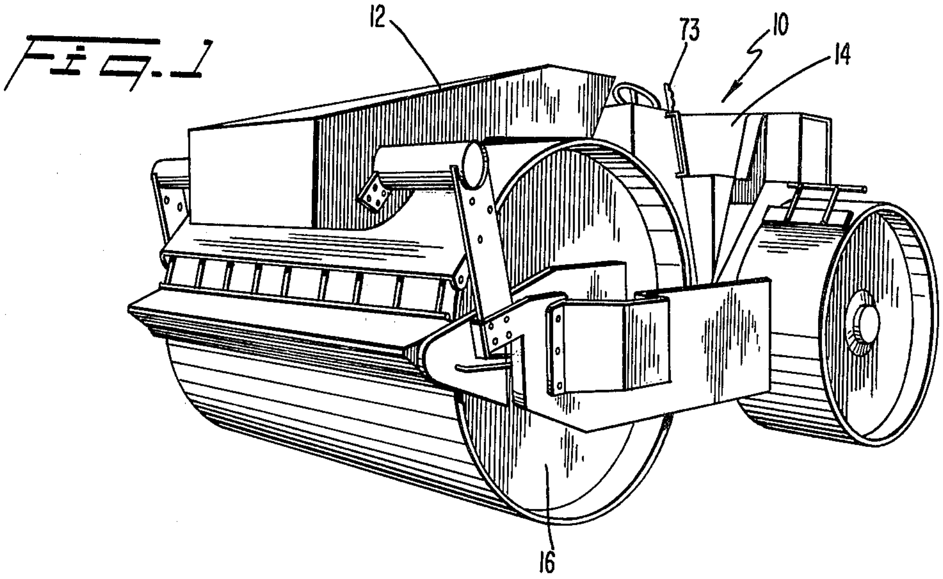
FIG. 1 is a perspective view of a compacting roll embodying the present invention.

A vibratory compacting roller 10 is depicted in FIG. 1. The roller comprises a frame 12, an operator's station 14, and a rotary compacting roller or drum 16, arranged in conventional fashion. Arranged within the roller 16 is a vibratory mechanism 18 in accordance with the present invention.

The vibratory mechanism 18 comprises a shaft 20 which includes first and second support portions 22, 24, mounted in suitable bearings 26, 28, respectively, carried by the roller 16. Interconnecting the support portions 22, 24, is an intermediate portion 30. The shaft 20 is rotatably driven about the longitudinal axis of the roller 16 by a conventional motor (not shown) similar to that described in copending application Ser. No. 06/237,596, of the present inventor and Gary Jackson entitled "Vibratory Roller", filed concurrently herewith, the disclosure of which is hereby incorporated by reference.

Projecting radially from the intermediate portion 30 of the shaft 20 are a pair of flanges 32, 34, which are connected for rotation with the shaft and together constitute a stationary eccentric mass which tends to generate vibration upon rotation of the shaft 20. The flanges 32, 34, are mounted on the shaft 20 over the keys 35A to ensure proper angular adjustment and are secured in position by screws 35.

Positioned between the flanges 32, 34, is a variable mass 36. The variable mass 36 surrounds the shaft 20 and is eccentric relative thereto in that the center of gravity of the variable mass 36 is spaced from the axis of rotation of the shaft 20. The mass 36 is termed "variable" in that its angular position on the shaft 20 can be varied due to a freely rotatable relationship between the mass 36 and the shaft 20 within prescribed limits, as will be explained. Anti-friction rings 38 are disposed in annular recesses of the variable mass 36 to facilitate such relative rotation.

At one of its ends the variable mass 36 is provided with an axially open cavity 40 (see FIG. 3). One side of the wall of the cavity 40 is axially stepped whereby a plurality of longitudinally and circumferentially spaced abutment surfaces 42, 44, 46, 48 and 50 are provided. Those surfaces terminate longitudinally at circumferentially extending wall segments 52, 54, 56, 58, 60, respectively, which are longitudinally spaced from one another.

The other side of the cavity 40 also includes a plurality of longitudinally and circumferentially spaced abutment surfaces 42A, 44A, 46A, 48A, 50A (FIG. 4) located at the ends of longitudinally spaced, circumferentially extending wall segments 52, 54A, 56A and 60A, respectively. The surfaces 42–50 and 42A–50A are symmetrically arranged relative to the axis of rotation of the variable mass 36.

Figure 2:
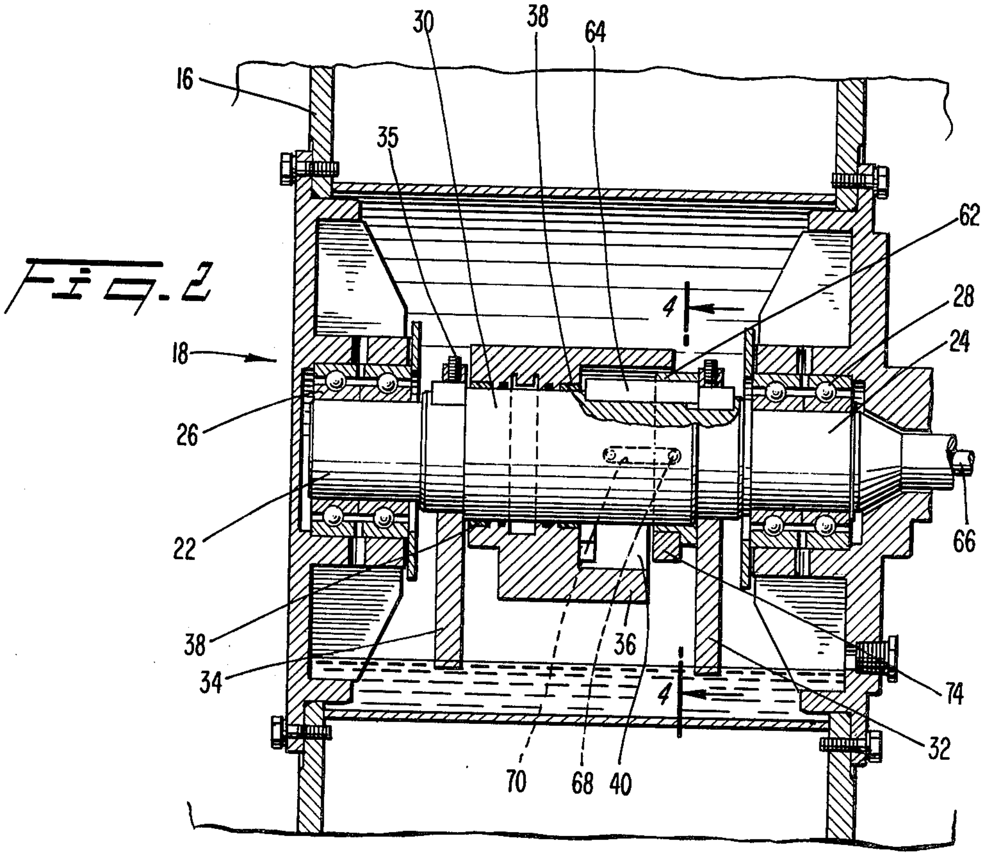
FIG. 2 is a longitudinal sectional view through a vibration system according to the present invention.

The surface 42 (or 42A) represents a low-amplitude mode of the vibratory mechanism and is located closer to the open end of the cavity 40 and farther from the center of gravity of the mass 36 than the other surfaces; the surface 50 (or 50A) represents a high-amplitude mode and is located farthest from the open end of the cavity and closest to the center of gravity. In FIG. 2 the variable mass 36 is depicted as disposed such that its center of gravity is closest to that of the fixed mass 32, 34, thereby representing a mode of greatest eccentricity.

Mounted for axial sliding movement along the intermediate portion 30 of the shaft 20 is a collar 62. The collar 62 is constrained against rotation relative to the shaft 20 by a key 64 carried by the intermediate portion 30 of the shaft 20, which key is received in a slot in the collar.

The collar 62 is axially displaceable relative to the shaft 20 by means of a control rod 66 which is slidably disposed within an axial through-bore of the shaft 20. The rod 66 is coupled to the collar 62 by a radially extending pin 68 which extends through a longitudinally extending slot 70 in the shaft 20 and which is received in diametrically opposed holes 72 in the collar 62. The rod 66 is suitably coupled to a control handle 73 at the operator's station 14 whereby the operator may slide the rod 66.

Fixed in the collar 62 and projecting radially therefrom is a drive dog 74 which is adapted to selectively engage the surfaces 42–50 (or 42A–50A depending upon the direction of rotation of the shaft 20) to rotatably drive the movable mass 36 with the shaft 20. During such rotation, the relative angular orientation of the movable mass 36 and the fixed mass 32, 34, is dependent upon which of the surfaces 42–50 is engaged by the drive dog 74.

For example, if the drive dog is longitudinally positioned nearest the open end of the cavity 40 as depicted in FIG. 3 (i.e., low amplitude position) it will travel about 180 degrees before striking the surface 42 (or 42A) when the shaft 20 is rotated about its axis. Accordingly, the location of the center of gravity of the movable mass 36 relative to that of the fixed mass 32, 34, is changed by about 180 degrees whereby the eccentric force of the latter is at least considerably counterbalanced, thereby minimizing the amplitude of vibration. After striking the surface (or 42A), the dog 74 continues to rotate the variable mass 36 along with the shaft 20. Thus, the shaft 20, fixed mass 32, 34, and the variable mass 36 rotate as a unit in the low-amplitude mode.

If the operator actuates the rod 66 via the handle 73 to shift the collar 62 and drive dog 74 to a position closest to the closed end of the cavity 40 (see the broken line position of FIG. 3), the drive dog 74 will be disposed between the surfaces 50, 50A, and thus drivingly engage one of such surfaces (depending upon the direction of rotation of shaft 20) to drive the variable mass 36 in the high-amplitude mode. Intermediate positions of adjustments are possible by locating the drive dog 74 in circumferential alignment with others of the surfaces 44–48 (or 44A–48A).

It will be appreciated that the variable mass 36, in being freely rotatable on the shaft 20, returns by gravity to a rest position wherein its center of gravity is disposed below the axis of rotation of the shaft 20 (FIG. 2). The shaft 20, due to the presence of fixed mass 32, 34, also rotates by gravity to a rest position in which the locking dog 74 is aligned with the space between the surfaces 50–50A (see FIG. 4) when the dog 74 can be moved to any of the positions of adjustment without interference with the wall segments 54–60 or 54A–60A, when the system is at rest.

Any member of surfaces 42–50 can be provided, depending upon the degree of versatility desired.

The locking dog 74 includes a pair of contact faces 75, 75A for engaging the surfaces 42–50, or 42A–50A. The faces 75, 75A, are somewhat offset relative to the axis of rotation of the shaft 20, i.e., they are not radially disposed. Thus, in order to ensure that planar contact occurs between the faces 75, 75A, and the surfaces 42–50 (or 42A–50A), the latter are offset from such axis by the same amount as the faces 75, 75A.

In order to minimize the impact occurring when the drive dog 74 engages the surfaces 42–50 (or 42A–50A), a dampening arrangement is provided. Such dampening arrangement comprises a projection 80 (FIGS. 3 and 5) which can be formed integrally with the variable mass 36 or affixed thereto. The projection 80 is disposed within a channel 82 formed in the variable mass 36, the channel containing a viscous dampening fluid 86. Annular seals 87 are disposed on opposite sides of the channel 84 to prevent leakage of fluid 86.

As the shaft 20 begins to rotate during the initial phase of system start-up, frictional interaction between the shaft 20 and the viscous fluid causes the fluid to flow in the direction of shaft rotation. The action of the fluid flowing against and past the projection 80 produces rotation of the variable mass 36 in the direction of rotation. Thus, the variable mass 36 is rotating when abutted by the drive dog 74, whereby the intensity of the impact is dampened.

It will be appreciated that the projection 80 and/or the channel 84 could be formed on the shaft 20. Alternatively, a second projection 90, possibly being apertured, could be formed on the shaft 20 to cooperate with the projection 80 on the variable mass 36 to dampen the amount of impact of the latter induced by initial rotation or at the stopping of the shaft 20.

In operation, prior to start-up of the shaft 20, the variable mass 36 and the drive dog 74 are in their rest positions, as depicted in FIG. 4, whereby the dog 74 is longitudinally aligned with the space between the high-amplitude surfaces 50, 50A, of the variable mass 36. The operator selects the desired amplitude of vibration by either leaving the locking dog in its rest position (whereupon it will eventually contact the low-amplitude surface 42 (or 42A), or by shifting the locking dog 74 via collar 62, pin 68, rod 66, and lever 73 longitudinally into circumferential alignment with one of the other surfaces 44, 46, 48, 50 (or 44A, 46A, 48A, 50A). When the shaft 20 is actuated and begins to rotate relative to the variable mass 36, the latter is rotated somewhat by the dampening arrangement 80, 82, 84, whereby the impact between the dog 74 and the selected one of the surfaces (or 42A–50A) is dampened. When such impact does occur, the shaft 20 drives the variable mass 36 whereby the latter and the fixed mass 32, 34, impart vibratory forces to the roller 16.

It will be appreciated that the vibratory system according to the present invention provides for an ample number of vibratory amplitude selections as desired and is relatively simple in construction and operation. Although the illustrations show a five position device, a different number of positions may be achieved as desired within the practical range. Moreover, the amplitude selections are available no matter which direction of rotation of the shaft is selected. The occurrence of shock upon the shaft impacting the variable mass is effectively minimized by the dampening arrangement.

It should be understood that while the surfaces 42–50 (or 42A–50A) have been disclosed in connection with the preferred embodiment as being disposed on the variable mass 36 and the contact surfaces 75 as being disposed on the collar 62, it will be appreciated that a reversal of those parts is possible whereby a contact surface is provided on the variable mass 36 and the surfaces 42–50 (or 42A–50A) are provided on the collar 62.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What I claim is:

1. In a vibratory mechanism of the type comprising a motor-driven shaft, a first mass carried by the shaft for rotation therewith, and a variable mass supported for rotation relative to said shaft whereby the angular relationship between said first mass and said variable mass can be selectively adjusted to vary the amplitude of vibration, the improvement comprising:

a drive member rotatable with said shaft, one of said drive member and said variable mass carrying a plurality of longitudinally and circumferentially spaced abutment surfaces, the other of said drive member and said variable mass carrying a contact face, engagement between said contact face and said abutment surfaces occurring at different angular relationships between said first mass and said variable mass to vary the amplitude of vibration, and control means producing relative longitudinal movement between said variable mass and said drive member to circumferentially align said contact face with a selected one of said abutment surfaces such that rotation of said drive member produces driving engagement between said selected surface and said contact face to rotate said variable mass with said shaft.

2. Apparatus according to claim 1, wherein said surfaces are carried by said variable mass and said contact face is carried by said drive member.

3. Apparatus according to claim 2, wherein said drive member comprises a driving dog keyed to said shaft for axial movement relative thereto, said control means comprising a manually actuable rod connected to said dog for longitudinally displacing said dog.

4. Apparatus according to claim 1, wherein said one of said drive member and said variable mass carries a second plurality of axially and circumferentially spaced abutment surfaces arranged symmetrically relative to said first-named plurality about the rotary axis of said shaft, said other of said drive member and said variable mass carrying a second contact face for selectively engaging said second surfaces, said shaft being rotatable in a first direction for producing engagement between said first-named abutment surfaces, and rotatable in a second direction for producing engagement between said second contact face and a selected one of said second surfaces.

5. Apparatus according to claim 1, including dampener means responsive to rotation of said shaft for inducing rotation of said variable mass prior to engagement between said contact face and said selected surface, to dampen the impact of such engagement.

6. Apparatus according to claim 5, wherein said dampening means comprises a projection connected to said variable mass and disposed within a fluid-filled channel between said shaft and said variable mass.

7. Apparatus according to claim 1, wherein there are at least three abutment surfaces defining three different amplitudes of vibration.

8. Apparatus according to claim 1, wherein there are five abutment surface defining five amplitudes of vibration.

9. A vibratory mechanism of the type comprising a shaft, a motor for driving said shaft in either direction, a first mass carried by the shaft for rotation therewith, and a variable mass supported for rotation relative to said shaft whereby the angular relationship between said first mass and said variable mass can be selectively adjusted to vary the amplitude of vibration, the improvement wherein:

said variable mass is driven in response to being engaged by a drive face carried by said shaft, means for shifting the location of said engagement:

between more than two locations in relation to a first direction of rotation of said shaft, which locations respectively produce different angular relationships between said variable mass and said first mass, and between more than two locations in relation to a second direction of rotation of said shaft, which locations respectively produce different angular relationships between said variable mass and said first mass.

* * * * *